Patented July 12, 1927.

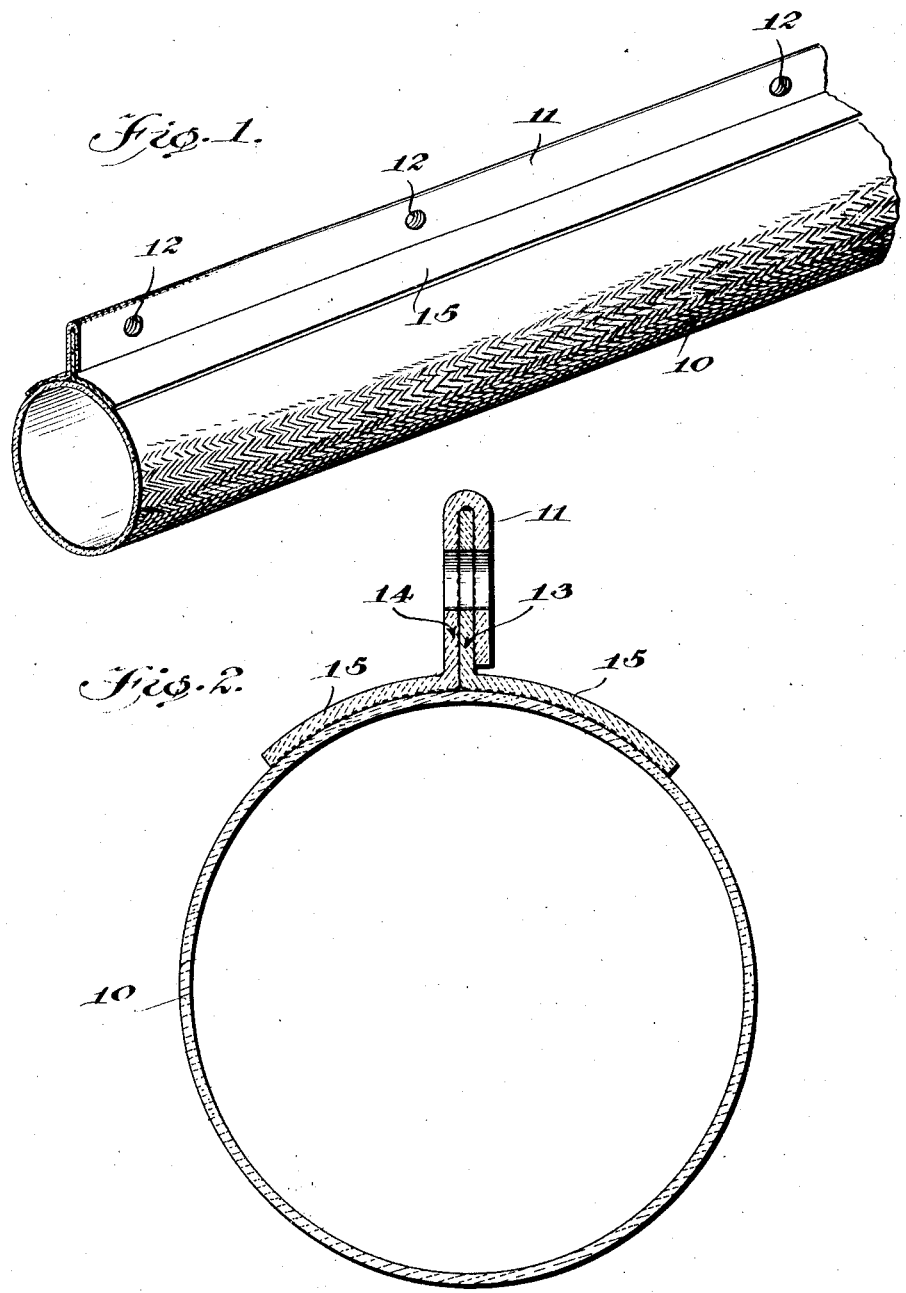

1,635,957

UNITED STATES PATENT OFFICE.

ALLAN S. RICHARDSON, OF BUTTE, MONTANA.

REENFORCED AIR HOSE.

Application filed August 3, 1926. Serial No. 126,842.

My present invention relates generally to canvas hose or tubing such as is used in mine ventilation as a carrier for the ventilating air. As commonly used the canvas hose or tubing is suspended along its length from an over-head support and is subjected to more or less pressure from the air forced through the tube, as the result of which it has been found that the hose or tube frequently breaks in the first instance along the line of its support, indicating that the greatest strains brought about by the internal pressure is along this line. Up to the present time air hose or tubing of this nature has been supported by providing the same with a longitudinal flange provided with eyelets at spaced points, for the reception of suspension members or hooks, and the flange has been formed by bent or folded portions of the hose or tubing itself.

My invention purposes air hose or tubing of the above nature, and for the above purpose in which the flange is formed by separate pieces bent, folded, or otherwise constructed to give the required body to the flange, and portions of which are extended on and secured to the hose or tubing along those portions thereof substantially upon opposite sides of the flange so as to thus reenforce, where experience has demonstrated to be the points of initial failure of the hose or tubing in use.

In the accompanying drawing which illustrates my present invention and forms a part of this specification:—

Figure 1 is a perspective view showing a section of air hose or tubing constructed as proposed by my invention, and, Figure 2 is a vertical transverse section taken therethrough on an enlarged scale.

Referring now to these figures, I have shown the canvas hose or tubing 10 of cylindrical form, with a flange 11 externally thereof, and extending therealong, provided at spaced points with openings 12 with or without eyelets therethrough, for the reception of suitable suspension members, which, in practice engage an overhead support.

The flange 11 in accordance with my invention is formed by means of a pair of separate pieces 13 and 14, of which the latter is bent over the former in order to give sufficient body to the flange and avoid a raw seam along the outer edge thereof. These separate pieces 13 and 14 which thus make up the flange may be of the same material, of which the hose or tubing 10 is formed and have extending portions 15 at the inner edge of the flange adjacent to the hose or tubing for extension outwardly along the latter substantially upon opposite sides of the flange. These extending portions 15 may be secured to the hose or tubing in any suitable manner, as by means of stitches or cement, and serve to effectively reenforce those portions of the hose or tubing immediately adjacent to its flange, which experience has shown are likely to initially fail under the internal compression to which the air hose or tube is subjected in use.

My invention overcomes the difficulties first above noted in a simple effective manner, and permits of the desired improvement with minimum additional expense.

I claim:

1. An air hose having a flexible suspension flange externally and continuously therealong having means to facilitate attachment of the hose in use to a suitable support, said flange comprising connected strips separate from the hose and provided with inner portions extended along and in connection with the hose substantially upon opposite sides of the flange, whereby to reenforce the hose adjacent to the flange.

2. An air hose having an external flexible suspension flange continuously therealong, the flange comprising connected strips, one of which envelops the other, said strips having portions secured to the tube, and reenforcing the latter along opposite sides of the flange.

3. An air hose having an external flexible flange continuously therealong and pierced at spaced points to provide for its attachment to a suitable support, the said flange consisting of strips, one overlapping the other, said strips having portions reenforcing the tube along opposite sides of the flange.

ALLAN S. RICHARDSON.